United States Patent
Hamel et al.

(10) Patent No.: US 7,979,546 B2
(45) Date of Patent: *Jul. 12, 2011

(54) METHOD, SYSTEM, AND PROGRAM PRODUCT FOR SEQUENTIAL COORDINATION OF EXTERNAL DATABASE APPLICATION EVENTS WITH ASYNCHRONOUS INTERNAL DATABASE EVENTS

(75) Inventors: Elizabeth B. Hamel, Morgan Hill, CA (US); Bruce G. Lindsay, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 494 days.

This patent is subject to a terminal disclaimer.

(21) Appl. No.: 12/103,548

(22) Filed: Apr. 15, 2008

(65) Prior Publication Data

US 2008/0195673 A1    Aug. 14, 2008

Related U.S. Application Data

(63) Continuation of application No. 10/143,317, filed on May 9, 2002, now Pat. No. 7,426,559.

(51) Int. Cl.
*G06F 17/30* (2006.01)
(52) U.S. Cl. ........ 709/225; 709/235; 709/203; 709/245; 709/224; 709/220; 709/217; 709/218; 709/219; 370/230; 370/235; 370/352; 370/299; 714/15; 714/20; 714/13
(58) Field of Classification Search .................. 709/225, 709/200–204, 235, 245, 224
See application file for complete search history.

(56) References Cited

U.S. PATENT DOCUMENTS

| | | | |
|---|---|---|---|
| 5,261,094 A | 11/1993 | Everson et al. | |
| 5,541,784 A | 7/1996 | Cribbs et al. | |
| 5,799,322 A | 8/1998 | Mosher, Jr. et al. | |
| 5,799,323 A | 8/1998 | Mosher, Jr. et al. | |
| 5,806,075 A | 9/1998 | Jaine et al. | |
| 5,862,318 A | 1/1999 | Habben | |
| 5,995,980 A * | 11/1999 | Olson et al. | 1/1 |
| 6,128,645 A | 10/2000 | Butman et al. | |
| 6,212,529 B1 | 4/2001 | Boothby et al. | |
| 6,243,757 B1 | 6/2001 | Kanodia et al. | |

(Continued)

FOREIGN PATENT DOCUMENTS

DE         19836347 A1      8/1998

(Continued)

OTHER PUBLICATIONS

Salem, K. et al., "How to Roll a Join: Asynchronous Incremental View Maintenance", Research Report RJ10168 (95043), Computer Science/Mathematics, Dec. 1, 1999.

*Primary Examiner* — Jude J Jean Gilles
(74) *Attorney, Agent, or Firm* — Kunzler, Needham, Massey & Thorpe

(57) ABSTRACT

Database management systems, methods, and program products that exploit time dependent sequential database management system processes to ensure presentation of the same data or view to one or a plurality of users through sequencing asynchronous database management operations such as recovery and replication. Sequencing is accomplished through the use of entries in sequential logs, including transaction logs, recovery logs, and other data recovery tools and applications. Uses include managing data migration and data replication.

20 Claims, 9 Drawing Sheets

U.S. PATENT DOCUMENTS

| | | |
|---|---|---|
| 6,567,823 B1 | 5/2003 | Rothschild |
| 6,731,625 B1 | 5/2004 | Eastep et al. |
| 6,801,921 B2 | 10/2004 | Tsuchida et al. |
| 6,820,217 B2 | 11/2004 | Mock et al. |
| 7,103,566 B2 * | 9/2006 | Silva et al. ............ 705/26.8 |
| 7,103,586 B2 * | 9/2006 | Holenstein et al. ............ 1/1 |
| 7,130,870 B1 | 10/2006 | Pecina et al. |
| 7,426,559 B2 * | 9/2008 | Hamel et al. ............ 709/225 |

FOREIGN PATENT DOCUMENTS

| | | |
|---|---|---|
| EP | 0617362 A1 | 3/1994 |
| WO | WO00/10087 A1 | 8/1999 |

\* cited by examiner

METHOD, SYSTEM, AND PROGRAM PRODUCT FOR SEQUENTIAL COORDINATION OF EXTERNAL DATABASE APPLICATION EVENTS WITH ASYNCHRONOUS INTERNAL DATABASE EVENTS

CROSS-REFERENCES TO RELATED APPLICATIONS

This application is a continuation of and claims priority to U.S. patent application Ser. No. 10/143,317 entitled "A Method, System, and Program Product for Sequential Coordination of External Database Application Events with Asynchronous Internal Database Events" and filed on May 9, 2002 for Elizabeth B. Hamel et al., which is incorporated herein by reference.

FIELD OF THE INVENTION

The invention relates to database management systems, methods, and program products that exploit internal database management system processes to make data available in a plurality of copies maintained in a plurality of database management systems, commonly known as data replication. Uses include, but are not limited to, the propagation of data from one DBMS to another DBMS for use by applications using the second DBMS. More specifically, the invention provides a method and process to synchronize events occurring in the first DBMS with events critical to the accurate propagation of data from a first DBMS to a second DBMS.

BACKGROUND

Various database management system functions operate behind the scenes, preserving the value of the database and its contents. Two such time dependent, sequential, database management system functions are recovery logging and data replication.

In recovery logging the system maintains a log or journal to keep track of all operations that affect the values of database items. This log or journal records the history of database changes in a secure way and contains details of all updates to the database. The log may include "before" and "after" images of the state of an updated object. Thus, if it becomes necessary to undo some particular update, the system can use the corresponding log entry to restore the updated object to the previous value. The log or journal may be used to permit recovery from application or system errors or failures, and recover the consistency of the database right up to the point in time where an error occurred.

The log files are created automatically by the database management system when the database is created. Typically, the log consists of two portions, an "online" or "active" portion and an "archive" or "offline" portion. The "online" portion is the portion used during normal system operation to record details of the updates as they are performed, and is normally held on a local disk. When the online portion becomes full, or more frequently, its contents are transferred to the offline portion, which, because it is always processed sequentially, can be held on disk or in a tertiary storage device.

If the system crashes, it is possible to recover to a transaction consistent database state by examining the log and using various recovery algorithms, such as the one described by C. Mohan, D. Haderle, B. Lindsay, H. Pirahesh, and P. Schwarz, in "*ARIES: A Transaction Recovery Method Supporting Fine Granularity Locking and Partial Rollbacks Using Write Ahead Logging*" TODS 17(1): pp. 94-152 (1992). With the recovery log, it is possible to undo WRITE operations by tracing backward through the log and resetting all items changed by a WRITE operation of an identified TransactionID to their Old_Value. Likewise, redoing may be needed if all of the updates are recorded in the log, but a failure has occurred before all of the New_Values have been written (permanently) to the database. Redoing is accomplished by tracing forward through the log and setting all of the items changed by a WRITE operation of TransactionID to their New_Values.

Replication is a process of maintaining a defined set of database content, including database entries, and files, in more than one database. Replication involves copying (capturing) designated changes from one database (a source) and applying designated changes to another database (a target). The source and target can be in the same or different logical servers that are on the same machine or on different machines in a distributed network or different networks.

Data replication includes a "capture" process at the source database, an "apply" process at the target database, and "clean up" processes at both databases, and uses a plurality of co-ordination, control, communications, timing, and logging functions and applications. Data replication applications, such as IBM DB2 DataPropagator, consist of three main components: administration interfaces, change-capture mechanisms, and change-apply mechanisms. A user uses the administration interfaces to create a replication environment, including control tables, that designate data to be replicated and control the replication methods and processes. The control tables store user replication criteria and monitor data replication progress. After the user sets up a user replication environment, the user uses a change-capture mechanism to capture changes that may not be contemporaneous and that occur in the source database and store them temporarily in tables. Finally, the user uses the apply program to apply the captured entries to target databases, or to copy data directly from the source database to the target databases.

The capture and apply replication components use a variety of control tables, logs, timestamps, buffers, and search engines to communicate with each other and to manage replication requests, such as defining and managing replication sources and targets, capturing changes, replicating changes, tracking how many changes are replicated and how many remain to be done, and applying changes to the target.

The replication components reside on one or more logical servers. As used herein, logical servers refer to databases, not to hardware servers in the client/server sense. For the IBM OS/390 operating system, logical servers are equivalent to subsystems or data-sharing groups (that is, the domain of a single database catalog). There are three types of logical servers in replication: a source server, a target server, and a control server.

The source server contains the change-capture mechanism, the source tables that a user wants to replicate, and the control tables for the capture program. The target server contains the target tables. The control server contains the control tables for the apply program.

The apply program can reside on any of the logical servers in the network. Each apply program is associated with one control server, which a user specifies when the user starts the apply program. Multiple apply programs can share a control server.

A DBMS data replication solution offers various mechanisms for capturing data, including analysis of the contents of the recovery log. For example, when the source is an IBM DB2 table, the capture program is used to capture changes that are made to the source. The capture program interrogates the contents of the database recovery log to deduce changes made to the source database and to record them temporarily for transfer to the apply program at the target database. Typically the capture program runs at the machine hosting the source database server. While the capture program may run continuously, a user can stop capture while running utilities or modifying replication sources. Tasks that a user can perform with the capture program include starting the capture program, scheduling the capture program, stopping the capture program, suspending the capture program temporarily, resuming the capture program, reinitializing the capture program, and pruning tables that temporarily store change data. Additionally, tasks associated with starting up and shutting down replication from specific servers' data tables are initiated by user command, for example, from administrative tools and interfaces.

Once the apply program has been started, the apply program reads data directly from source tables or views to initially populate the target objects in the target database table. If a user wants changes captured, the apply program reads the changed data that was previously captured and stored temporarily in staging tables, and applies the changes to target tables.

Tasks that a user can perform with the Apply program include starting the apply program, running exit routines (such as ASNLOAD to call an IBM or other utility), scheduling the apply program, and stopping the apply program.

The replication components are independent of each other; they rely on information that is stored in control tables to communicate with each other. The capture and apply programs update control tables to indicate the progress of replication and to coordinate the processing of changes.

Each time that the apply program copies data to the target database, the contents of the target database reflect the changes that were made to the source database. The apply program works by writing the updates accumulated since the apply program last ran. The Apply program keeps track of the latest update that it makes to each target.

To be noted is that the capture program will not capture any information until the apply program signals it to do so, and the apply program will not signal the capture program to start capturing changes until a user defines a replication source and associated subscription sets.

Replication may be synchronous or asynchronous. Synchronous replication delivers updates continually. When a change is made to the source data, it is immediately applied to the target database. A change is committed to the source database at the same time as the change is committed to the target database. If for some reason the change cannot be replicated to the target database, the change is not made to the source database. This type of replication is also called real-time replication. If a user application requires synchronous updates, the user application updates all of the tables in a single, distributed transaction.

Asynchronous replication delivers updates asynchronously to the process making changes to the source data. When a change is made to the source data, it is stored temporarily for a preset interval and forwarded to the target at a later time. The interval can be a measure of time (seconds, minutes, hours) or can represent a prescribed event (midnight, or some other time of day) or it can be best effort, as soon as possible. If changes cannot be made to a target database (for example, if the target database is down or the network is down), the changes are stored and applied later, in the order in which they were made to the source. Asynchronous replication provides certain identifiable benefits over synchronous replication: better use of network resources, less database contention, and the opportunity to enhance data before it reaches the target database.

With asynchronous replication, changes made to the source are not processed immediately. Rather, they are processed later when the replication system encounters the changes in the recovery log.

An important requirement of data replication systems is the need to synchronize data replication events with actions taken by the users and administrators. However, when the data capture process is, fundamentally, driven by the contents of the recovery log, the data replication process or method operates asynchronously to when the events are recorded in the log. Thusly, we perceive the need for a user or administrator to have a means (and mechanism) to direct the replication system to take specified actions (only) when the replication system is processing recovery log entries corresponding to the time when the user or administrator requested the action. For example, if a user wishes to stop replication of selected source data at, say, 10 AM, the user can take some action at 10 AM. But, at 10 AM, the replication system will not yet have processed the entries made to the recovery log before 10 AM. Thus, a direct (synchronous) communication between the user and the replication system at 10 AM can not be immediately used to suppress replication of changes that happen after 10 AM.

Thus, a clear need exists to provide a system, a method, a process, and a program product for synchronizing an event with a position in the event sequence embodied in the recovery log.

SUMMARY

According to our invention, it is possible to tie together multiple asynchronous processes, where events at one point in time are dealt with later. This later event is placed in the context of the earlier event. More specifically, our invention relates to a mechanism by which an application can do something at $T1$ which occurs in a sequence $T0, \ldots, Tn$, to have an effect at $Tj$, which is subsequent to $T1$ but prior to $Tn$. For example, the source event may say, "Now is now, now is after this activity but before that activity." In this context, the system is instructed "When you get to an arbitrary NOW do this." For example, when "data capture" gets to "now,", it "applies" the data, or when "data capture" gets to a subsequent "now", it stops "data capture."

In the context of our invention the recovery log is both a sequence of events and a sequential representation of the database state. Every entry in the database and every change to the database is in the recovery log. That is, the capture of this sequence to a point in the recovery log is a representation of the current state of the database at the point in time when the current recovery log entry was created. This sequence is the most reliable representation of the evolution of the data base state, while the more traditional set of relational database tables are an optimized representation of the current state of the data base (corresponding to the end of the recovery log).

Our invention exploits the sequential nature of the data log/recovery log database to sequence asynchronous processing of database update events, user actions controlling the replication system, and the actions of the replication system. We use the database recovery log to place events in sequence and especially to place asynchronous events in sequence. More particularly, we describe a method and process to use the recovery log to place an asynchronous event in the right sequence between adjacent asynchronous events.

As an illustration, "capture" reads the recovery log and performs an action with respect to recovery log contents and does something. For example, in the case of data replication, the "capture" program captures data from a source table and presents it to an "apply" program to write it to a target database. In this scenario a future "capture" is triggered by events (recorded in recovery log) that were recorded in the past. The replication capture system looks at past events and does "something."

This is further illustrated by a simplified electronic banking scenario. In this simplified scenario the daily transactions of debits and credits, and deposits and withdrawals are transferred from a the recovery log, called a daily ledger or a teller's ledger, to customer accounts once daily, for example at 3:00 AM. An appropriate entry is made in the recovery log at 3:00 AM, the data replication system is directed to extract and apply all outstanding changes in the recovery log until encountering a "special" entry made at 3:00:00.00.0 AM. The updated account status is then available on a database server associated with the bank's on-line banking web server.

To further illustrate the sequence and time delays, consider an end user application (such as a simplified airline reservation system) that may be used for real time data entry, while a data log/recovery log records the data entry in real time. A downstream data capture application examines the data log/recovery log to deduce changes and asynchronously feeds the changes to a "database" and further downstream applications (for example a data mining application or a web page). Not only are these data transfers not synchronous, but they may have significant time delays, for example from several minutes to "over night" between, for example, capture on the log to availability over the Internet.

In the hypothetical airline reservation system, as soon as reservation is made, all persons having direct access to the originating DBMS can see the reservation, that is, the reservationists can see it. However, there is frequently a delay before the passenger can see her reservation on the airline's web site. This is because the reservation server that feeds the airline web site asynchronously examines the data log to deduce changes, and thereafter applies the deduced changes to the web site "database" Only after the reservation is applied to the web site "database" is the particular reservation file available for web viewing.

The above two scenarios illustrate a situation where "something" is in the data log/recovery log. The "something" is a command that is recognizable as an instruction (or a pointer to an instruction) to the replication system. In the two scenarios above the instruction was an instruction for the "Capture" Program.

The method, system, and process of our invention and program products incorporating them are useful in creating, ordering, and managing events that are dependent upon or that can be made dependent upon a time line, such as a data log/recovery log. Exemplary events include initiating asynchronous data replication from a source data table to a target data table, replication to a new target table or to a target table having a new schema, or recovery at a common recovery point for two (distributed) databases, that is, applying the captured data to the first database and thereafter applying the captured data to the second database.

These scenarios all involve starting to capture data at or after some arbitrary time T0 without applying it to the target. We only begin applying the data at some later arbitrary time, T1, in response to an event indicating that applying data is allowed after the said event.

This is accomplished using the method, system, and program product described herein for managing a replication system. The database system has at least one database table and a recovery log. According to the invention, data is entered into the recovery log, along with commands, e.g., a first command and a second command, as a side effect of modifying tables of the database. The first command directs a first action with respect to the actions of the replication system and the second command directs a second action with respect to the actions of the replication system. For example, the first command is a signal stopping the capture of data from a particular database table, and the second command may be a signal starting copying into the same or a different or a modified database table.

In a still further embodiment of the invention, the system may perform an operation on the database table between the first command and the second command, and thereafter executing the second command, such as changing the schema or metadata of the database table between the first command and the second command, and thereafter executing the second command.

According to the invention, we capture changes to a first one of the database tables (the source table) until a stop signal is encountered in the recovery log, at which point we stop capturing data and we replicate the data that was logged prior to encountering the stop signal logged for the first (source) table to a second (target) database table. According to the method, system, and program product of our invention a computer system (including one or more computers) is configured and controlled to manage a database having more then one database table, where data is replicated from one database, a source database, to the other database, the target database, by stopping data entry into the first or source database, in response to a command or signal in a sequential file, for example, an appropriate log, journal, or control table, and trigger an Apply event; also in response to an appropriate entry in an appropriate sequential file, thereby migrating all records (the data recorded into the source database table up to, but not after, the stop command signal) to the target database.

The method includes logging database events to order or sequence future events. Using the method, system, process, and program product of our invention, data capture of logged changes to the first or source database table is stopped, in response to the recognition of a data change event affecting a distinguished database object (i.e., an identified table or element, as a signal table), the event specifying "stop." As used herein, the distinguished database object is a specified table, called the "signal table" and the data change event is the insertion of a row describing the event (e.g., "stop") into the signal table.

The program product may reside on one computer or on several computers or on a distribution server or a disk or disks or tapes. The program itself may be encrypted and/or compressed, as would be the case of distribution media or a distribution server, for example, before installation or it may be installed on the one or more computers.

The method, system, process, of the invention and program product incorporating the method, system, and process of the invention provide the database administrator with the ability to initiate specific actions at a future time corresponding to a precise log entry or record made at an earlier time. Finally, the method, system, and program product of the invention provide user friendliness and ease of use through a distinguished signal table that can be preconfigured for all users, so that no new tables or signal markers will need to be invented by the user, and both the placement in the sequence of the database events and all required information describing the user initiated (signal) event will be available in one easily updated and queried table.

Using the method, system, and program product of the invention, the end user can use an external interface, for example, a command line processor, an application program driving the standard program application program interface, or a graphical user interface, to mark a user database event with precision within the overall sequence of logged database events. This provides a mechanism such that the action initiated by the user event is correctly synchronized with replication system actions pursuant to other database user events.

Additionally, the method, system, and program product of the invention provide a mechanism such that the exact log sequence associated with a database transaction can be provided in order to be used to know the sequence of this event in regard to other logged database events. This in turn can be used in the calculation of compensation views in a rolling join method of maintaining a materialized view, as described in Kenneth Salem, Kevin S. Beyer, Roberta Cochrane, and Bruce G. Lindsay, "*How to Roll A Join: Asynchronous Incremental View Maintenance*", SIGMOD Conference 2000, pp. 129-140.

A further advantage of the invention is that a user can use an external interface, either textual or graphical, to specify a replication action to be taken at a precise desired sequence point with regard to other source database events. While stopping an asynchronous process through a command interface allows for no accuracy as to the stopping point in regards to the sequence of database log records, the method, system, and program product of the invention offers a programmatic interface that allows the database management process, for example, a replication or migration process, replication capture process to be stopped when it has reached an explicit user defined application/database event. By taking action at this specific and defined point, the replication system is able to correctly synchronize asynchronously requested user actions with the database event stream.

THE FIGURES

The method, system, and program product of the invention are illustrated in the FIGURES.

DETAILED DESCRIPTION OF THE INVENTION

Figure 1:
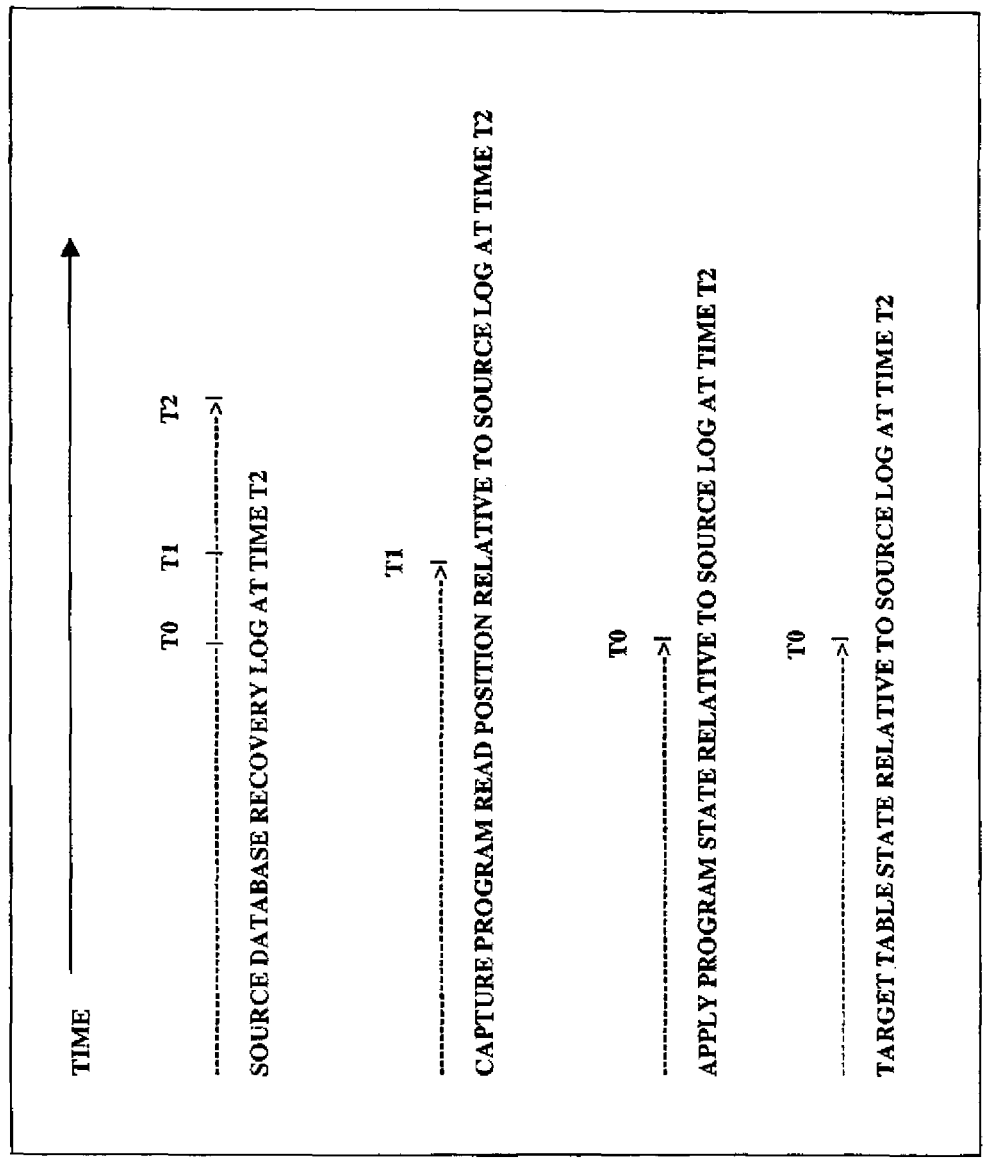
FIG. 1 illustrates the time relationships in a Data Base Management System, and especially the role of logs as a system time line.

FIG. 1 illustrates the time relationships, and specifically the role of the logs as a system time line. As shown in FIG. 1, the source database recovery log represents the state of the source database. The Capture program is reading this log asynchronously and at any time T2, the capture program will have read events recorded in the recovery log up to T1, with the delta, $\Delta=T2-T1$, typically being greater than zero. T1=T2 only when there is no database activity of any kind and the capture program is fully caught up with all past source database activity. The Apply program runs asynchronously from the capture program and will have applied the changes captured up to point T0, with the delta, $\Delta=T2-T0$, typically being greater than zero, and the delta, $\Delta=T1-T0$, being greater than zero. With regard to tables that are being replicated from the source system to the target system, the position of the apply program represents the state of the target database. That is to say that the target tables at time T2 are at the source state T0.

The invention allows for the creation of a log event at time T2 such that the actions of one or more of the asynchronous replication programs can be synchronized (necessarily at a time T3 later than T2) relative to the time T2 at the source and therefore objects controlled by these asynchronous replication programs can also be synchronized to this same state as they existed at the source database at time T2. The log event at time T2 is created through an external device, program, or database API in the form of a change to the state of a distinguished database signal table.

Figure 2:
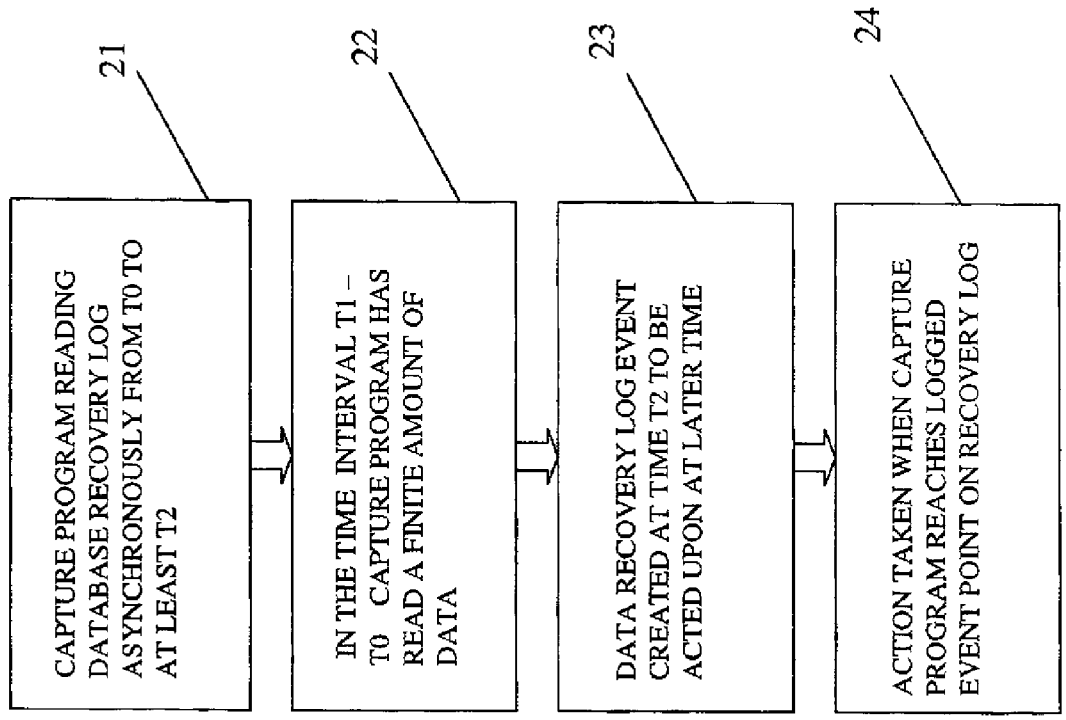
FIG. 2 is a high level flow chart of a Data Base Management System that exploits the time relationships recorded in the logs to manage Data Base Management System events.

FIG. 2 is a high level flow chart of a Data Base Management System that exploits the time relationships recorded in the logs to manage Data Base Management System events. As shown in FIG. 2, the capture program reads the database recovery log asynchronously from T0 to at least T2, block 21, such that in the time interval from T1 to T2 the capture program has read a finite amount of data, represented by block 22. As shown in block 23, a data recovery log event is created at time T2 to take an action at time T3. As shown in block 24, the action is taken at time T3.

Figure 3:
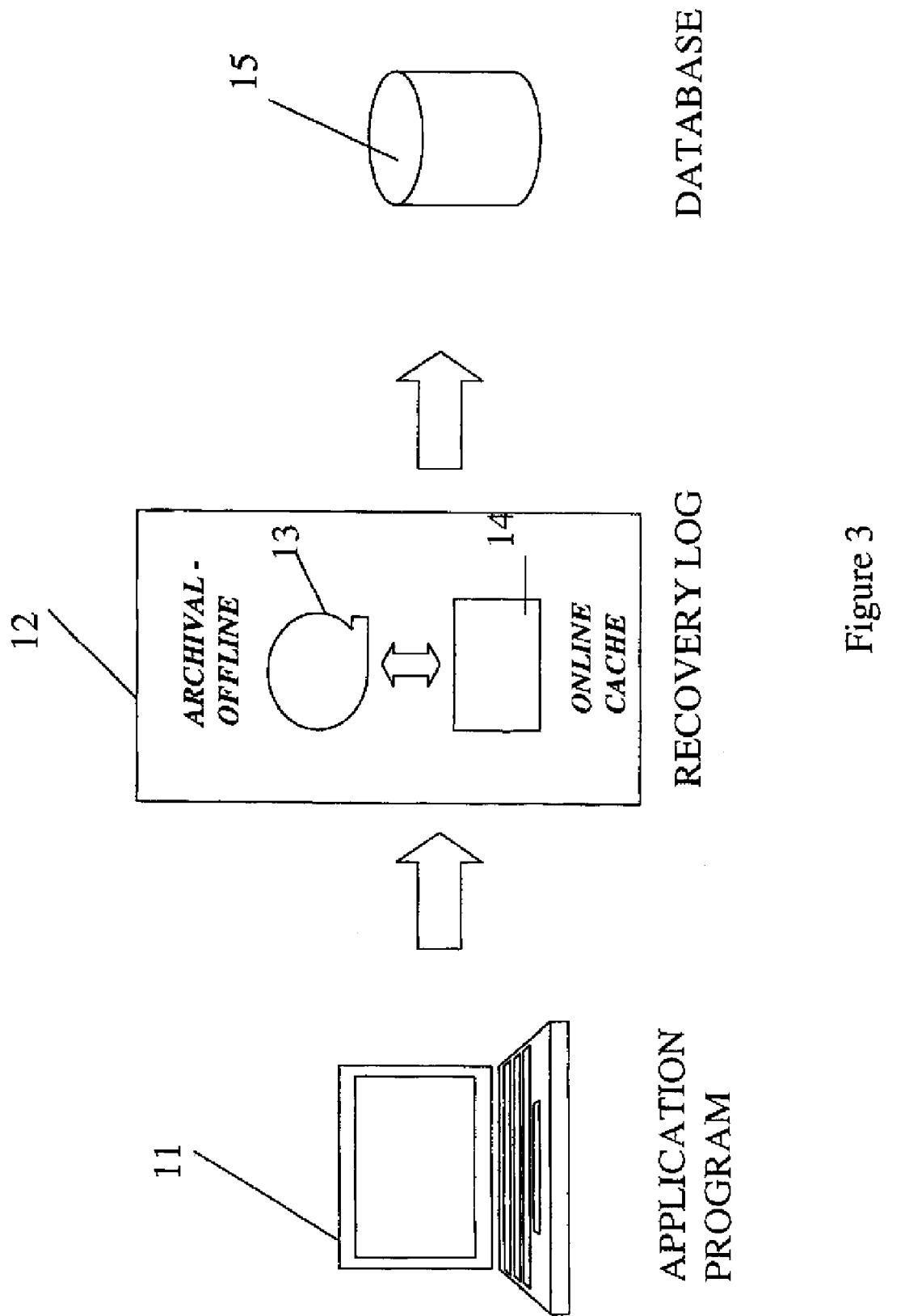
FIG. 3 is a high level schematic view of a database management system, receiving data from an application program and entering the data through a recovery log to a database.

FIG. 3 is a high level schematic view of a database management system, receiving data from an application program and entering the data through a recovery log to a database. Specifically, FIG. 3 shows a simplified view of a database management system, with the data entry application program, 11, represented by a laptop computer, a data recovery log system, 12, which may include offline archival storage, 12, and on-line cache storage, 14, in various combinations and topologies.

According to the method, system, and program product of our invention it is possible to configure and control a computer system (including one or more computers) to manage a database having two or more database tables and one or more replication signal tables, including log sequence number data. According to the invention, the method includes entering data into a first one of the database tables (the source table) and replicating data from the first (source) table to a second (target) database table. The method includes logging database events and sequence numbers. Using the method, system, and program product of our invention data entry into the first or source database table is subjected to a database event, for example, stopped, a command signal row associated to the event, for example, a stop command signal row, having an associated log sequence number is inserted into the replication signal table; the replication signal table is updated to the current log sequence number. At this point the source database is replicated to the target database; triggering an Apply event; replicating all records up to, but not after, the log sequence number to the target table.

The method, system, and program product of the invention, including a replication scheme, incorporating an external textual or graphical user interface coordinates real world events (such as transactions) and database events with replication events. This textual or graphical user interface provides the capability for a user to accomplish one or more of establishing externally the "log sequence number" (lsn) that correlates to a user database update transaction, optionally cause certain replication events to occur in the required sequence of events, and optionally also stop the replication process at the time that this lsn has been read by the replication capture log read program. These new functions are part of the "command and communications" functions shown in FIG. 4

Figure 4:
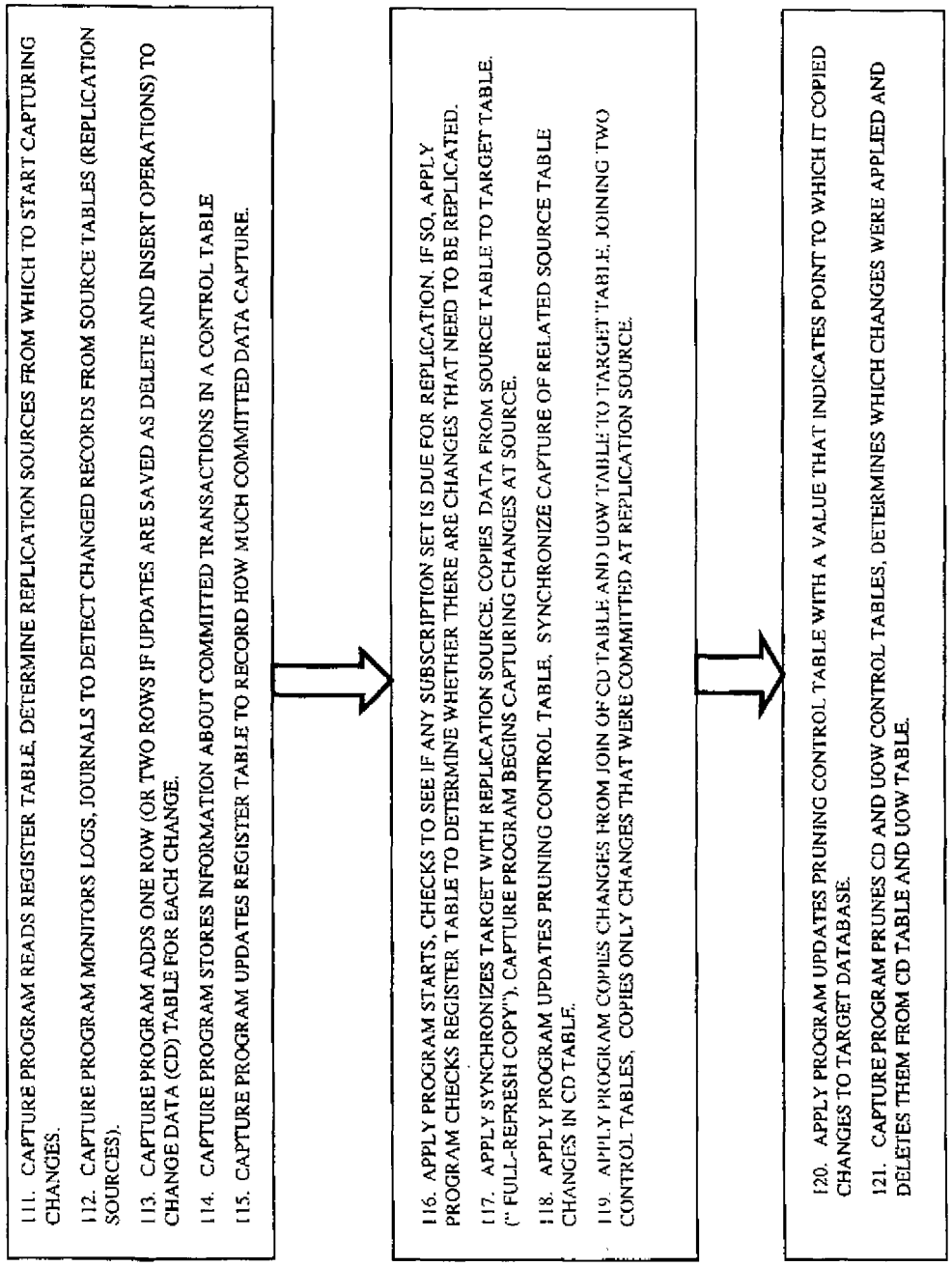
FIG. 4 illustrates one application of the method, system, and program product of the invention, where the data recovery log is used to control data replication.

Specifically, FIG. 4 illustrates in detail the three steps of capture, apply, and clean up. The capture routine includes elements 111 through 115, the apply routine includes elements 116 through 119, and the clean up routine includes elements 120 through 121.

Turning to the capture program, elements 111 through 115, the capture program reads the register table, 111, to determine the replication sources from which it needs to start capturing changes. The capture program monitors the logs or journals, 112, to detect change records from source tables that are defined as replication sources. The capture program adds one row (or two rows if updates are saved as DELETE and INSERT operations) to the change data (CD) table for each change that it finds in the log or journal, 113. To be noted is that each replication source has a CD table. The capture program stores information about committed transactions in a control table, also known as a unit-of-work (UOW) table, 114. The rows in this control table identify the transactions that have been committed in the replication source server. With log-based change capture, there is one UOW table for every source server. Finally, the capture program updates the register table, 115, to record how much committed data was captured for each replication source.

At this point data is actually transferred to the target database table or tables for application by the apply routine, elements 116 through 119.

When the apply program, elements 116 through 119, is started, it checks to see if any subscription set is due for replication, 116, and if so, the apply program checks the register table to determine whether there are changes that need to be replicated. Before the apply program can copy the changes to the target database, it synchronizes the target with the replication source by copying all the data from the source table to the target table, block 117. This action is called a full-refresh copy. The capture program begins capturing changes before the full-refresh copy begins. But, the captured changes need not be applied before the full refresh copy is completed.

The apply program updates the pruning control table, 118, to synchronize the capture of the related source table changes in the CD table. The apply program copies the changes from the join of the CD table and the UOW table to the target table, 119. By joining the two control tables, the apply program ensures that it copies only the changes that were committed at the replication source.

The last step is clean up. At this point, 120, the apply program updates the pruning control table with a value that indicates the point to which it copied changes to the target database. As part of clean up the capture program removes entries from the CD and UOW control tables, 121, determines which changes were applied and deletes them from the CD table and the UOW table.

According to the invention, the method includes entering data into a first one of the database tables (the source table) and replicating data from the first (source) table to a second (target) database table, with logging of database events and sequence numbers. For replication, data capture into the first or source database table is stopped, a stop command signal row having an associated log sequence number is inserted into the replication signal table; the replication signal table is updated to the current log sequence number. At this point the source database is replicated to the target database; triggering an Apply event; replicating all records up to, but not after, the log sequence number to the target table.

This replication is accomplished through a new control table in the product configuration. This will be referred to as a signal table. The signal table is created to be accessible through an external graphical user interface or textual application program interface through which a user can coordinate a database event (an insert to the signal table) with replication events (the actions taken when signal table inserts are read from the database recovery log).

The signal table is created with the data capture changes attribute, and therefore all inserts/updates/deletes to the table will be visible to the capture process that reads the recovery log. The DBMS "log read" api filters out any log records for tables which do not share the data capture changes attribute. The capture program provides special handling and reactions for any log records that indicate a successful insert to the signal table (successful in this case means that the insert was committed successfully in the database, and recognized by the capture program when the commit log record corresponding to the signal insert transaction is read from the log). The values supplied in the row inserted into the signal table must adhere to a proscribed format, and the corresponding actions taken by the capture program will depend on the inserted values of the signal row as read from the log record.

The signal table has the pseudo code representation:

```
CREATE TABLE <capture_schema>.IBMSNAP_SIGNAL (
  SIGNAL_TIME      TIMESTAMP NOT NULL WITH DEFAULT,
  SIGNAL_TYPE      VARCHAR(30) NOT NULL,
  SIGNAL_SUBTYPE   VARCHAR( 30),
  SIGNAL_INPUT_IN  VARCHAR( 500),
  SIGNAL_STATE     CHAR(1) NOT NULL,
  SIGNAL_LSN       CHAR(10) FOR BIT DATA)
DATA CAPTURE CHANGES;
)
```

SIGNAL_TIME must be a unique timestamp, and would usually be specified by the user as the DB2 function "current timestamp." SIGNAL_TYPE is a variable character format with maximum length of 30. SIGNAL_SUBTYPE is a variable character format with maximum length of 30. SIGNAL_INPUT_IN is a variable character format with maximum length of 500. SIGNAL_STATE This is a single character format with length of 1. SIGNAL_LSN is a binary character data type of length 10.

The following examples are illustrative of the method, system, and program product of the invention.

The first example illustrates the coordinated recovery of multiple databases. In this scenario a source updateable database is being copied using database replication to a second target database that is used for read only transactions. The source database is configured for recovery to a point in time, but if the first database is recovered, to be consistent it is desirable to be able to recover the target database to a state consistent with the source database.

The method for achieving this recovery using the signal table of the invention (and illustrated in the flow chart of FIG. 5) is as follows:

The user stops activity on the source database in anticipation of a database image copy or backup utility. After source activity has been stopped, the user inserts a row into the replication signal table indicating that replication should stop collecting change records when reaching this signal on the log. The replication capture component reads and continues to process log records until the signal insert log record is found. Capture then gracefully terminates, having captured and committed all prior source database changes into its control tables. The signal table is updated by the capture component to indicate that this stop signal has been processed. The source database can now be copied to a backup image.

The update made by capture has now supplied the log sequence number (lsn) of the signal insert log record, and either through a user program or a trigger defined on the signal table, an event row is inserted into the replication EVENT table, supplying the value of the lsn as the END_SYNCHPOINT value in the event row. The Apply program for all tables at the target database can then be replicated just to the point of the source lsn. When Apply has completed this action, all synchpoint values in the table IBMSNAP_SUBS_SET will have that same lsn value obtained from the signal update. At this point, the target database can be image copied. This image copy will now be in synch with the image copy made on the source database. If a recovery to a point in time is now required, these two recovery points are in synch and can be used to bring the two databases to a consistent state by running recovery operations on both databases.

Figure 5:
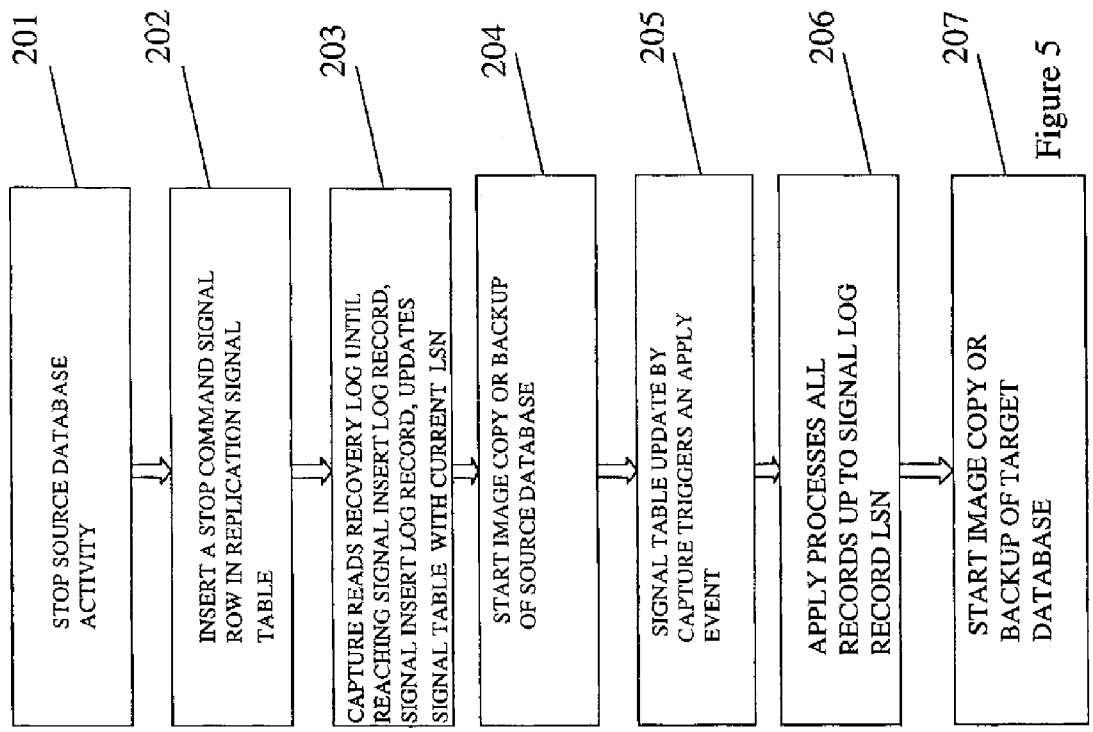
FIG. 5 illustrates the use of the method, system, and program product of the invention using the signal table for recovery.

This is as shown in FIG. 5, where Block 201 shows stopping source database activity, that is, a temporary pause in entering data into the source database, while block 202 shows inserting a stop command signal row in the replication signal table. Block 203 shows the capture process subsequently reading the signal insert log record and updating the signal table with the current lsn. Block 204 shows starting the image copy or backup of the source database. Block 205 shows that the signal table update by the capture process triggers an apply event. Block 206 shows the apply process processing all records up to the record pointed to by the signal log record lsn. Block 207 shows start the image copy or backup to the target database.

In an another scenario a replicated tablespace needs to be altered in a way that will affect the replication of the table. This could involve changes in database schema or metadata. This particular scenario assumes that a source updateable database is being copied using database replication to a second or target database that is used for read only transactions. A table from the source database which is being replicated to the target database is defined in a tablespace created without database compression. The user desires to alter the tablespace such that database compression will be used. This change will affect the system catalog tables—they will reflect the compression use in the tablespace, and will also affect the database log records—they will change from being non compressed to compressed. As far as the database is concerned, this change is synchronous—the log read API will now behave as though all log records are compressed. If the user makes this change abruptly, and the replication capture program is still reading older non compressed log records, the log records will suddenly become unintelligible to the log read API that is expecting to decompress log records. There are many such scenarios of table or tablespace schema or metadata alterations that have the propensity for creating temporary inconsistencies between the system catalog definitions, the replication control table definitions, and the log records to be processed.

The method for achieving this alteration without causing replication problems is by using the signal table. The user stops activity on the source database in anticipation of the tablespace alteration. After source activity has been stopped, the user inserts a row into the replication signal table indicating that replication should stop when reaching this signal on the log. The replication Capture component reads and continues to process log records until the signal insert log record is found. Capture then gracefully terminates, having captured and committed all source database changes into its control tables. The signal table is updated by the capture component to indicate that this stop signal has been processed. All activity that remained to be processed on the logs prior to the alteration of the source table have been processed.

The alteration (i.e., the change or changes in schema and/or metadata) can now be made, and then the capture program can be safely restarted. This is illustrated by the following sequence, shown in FIG. 5.

Figure 6:
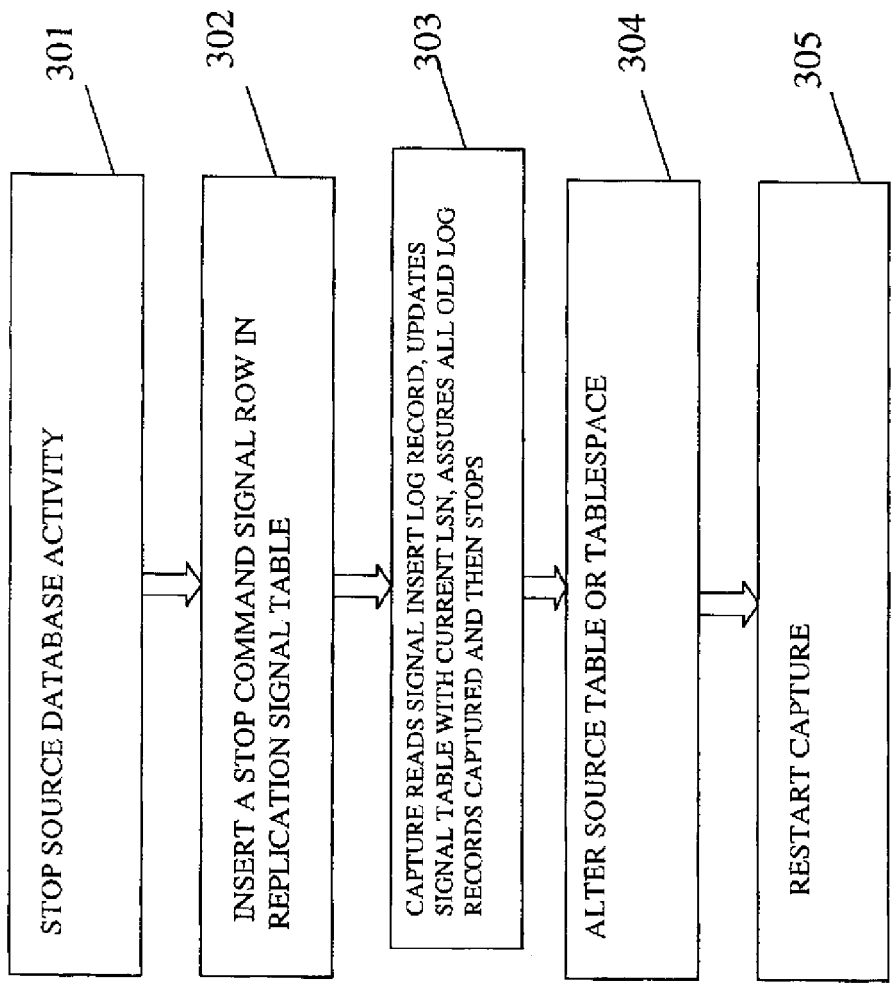
FIG. 6 illustrates how an alteration (i.e., a change or changes in schema and/or metadata) can now be made, and then the capture program can be safely restarted to replicate the metadata or schema change.

FIG. 6 illustrates the process starting with Block 301. Block 301 shows stopping the source database activity. Block 302 shows inserting a stop command signal row in the replication signal table. Block 303 shows the capture reading the signal insert log record, updating the signal table with the current lsn, and then stopping. Block 306 shows altering the source table or tablespace. Block 307 shows restarting capture.

A further scenario where the source database is being altered is where a source updateable database is being copied using database replication to a second target database that is used for read only transactions, and a table from the source database which is being replicated to the target database has a new column added. This new column must also be added to the replication staging table and the target table, and that all changes must be smoothly coordinated. The staging table should not be altered until the source table has been altered AND all former log records for this table have been read and captured, but before any new log records are received that contain data for the new column. The target table should not be altered until the source table has been altered AND all former log records for this table have been applied, but before any new data has been captured.

The user stops activity on the source database in anticipation of the table alteration. After source activity has been stopped, the user alters the source table and inserts a "reinit" row into the replication signal table indicating that replication should change its metadata regarding this source table, and reinitialize its internal data structures for this replication table definition when reaching this signal on the log. The replication capture component reads and continues to process the old log records until the signal insert log record is found. Capture commits its current database changes into its control tables, and then alters its own metadata to match the newly altered source. The signal table is updated by the capture component to indicate that this reinit signal has been processed, and updates the record with the lsn of the reinit signal insert. A trigger on the reinit table inserts a "reinit" event to the apply event table, with the lsn of the signal insert. Apply then can know to apply data up to the signal lsn with the old metadata, commit this data, dynamically alter the apply metadata to reflect the new source structure, and then continue to Apply data based on the new structure.

Figure 7:
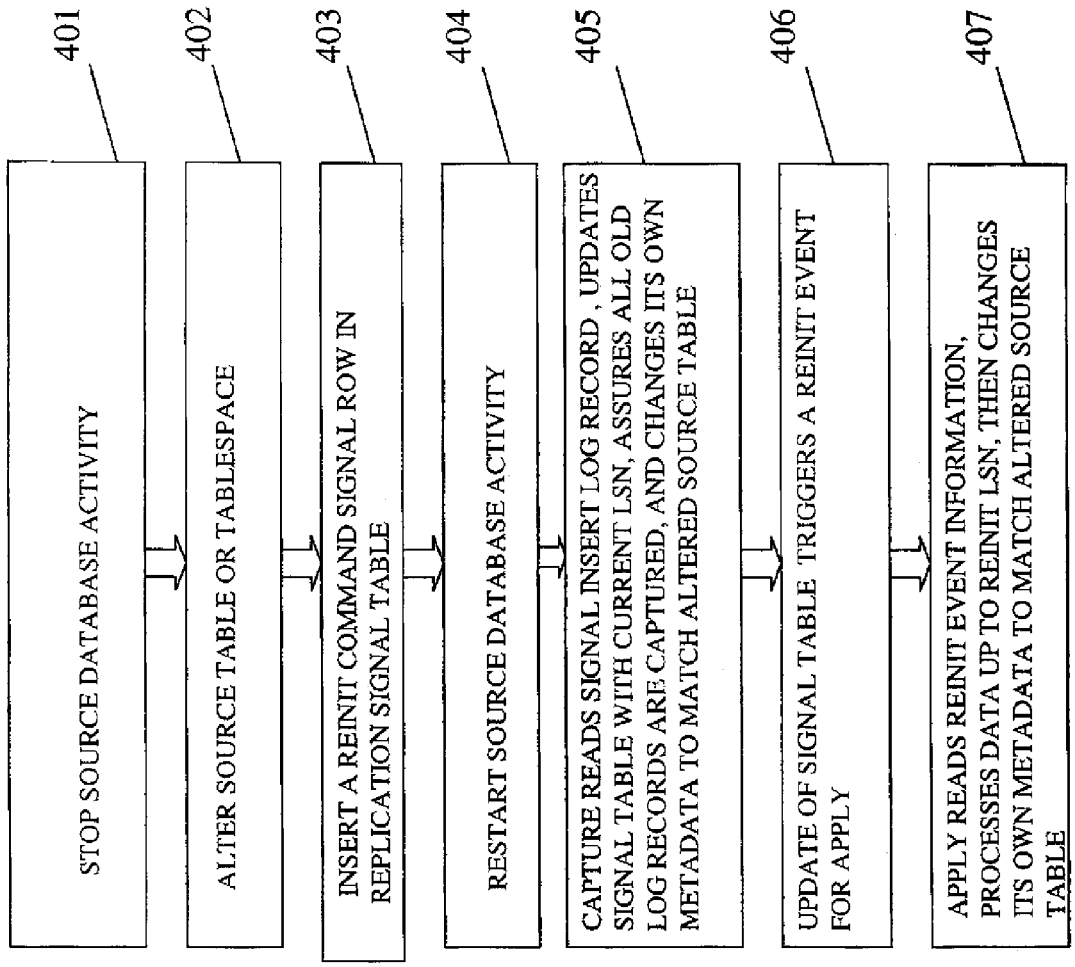
FIG. 7 illustrates the steps for carrying out replication in the face of an alteration of source metadata or schema.

As illustrated in FIG. 7, the steps for carrying out replication in the face of an alteration of source metadata or schema are as follows: first, as shown in block 401 source database activity is stopped. Next, block 402 shows altering the source table or tablespace, while block 403 shows inserting a reinit command signal row in the replication signal table. Block 404 shows restarting the source database activity. Block 405 shows the capture process reading the signal insert log record, updating the signal table with the current lsn, and changing its own metadata to match the altered source table. Block 406 shows updating of the signal table which triggers a reinit event for apply. Block 407 shows apply reading the reinit event information, processing data up to the reinit lsn, then changing its own metadata to match the altered source table A still further scenario is coordinating the replication of a data warehouse up to a specific source database reference point. This scenario assumes that a first, source updateable database is being copied using database replication to a second, target database that is used as a data warehouse. It is desirable that the data warehouse always reflects the contents of the source database as of a specified point in time of the prior day. This point in time could be an actual timestamp, such as 5:00 pm each day, or it could reflect an application specific event such as an application program that determines the end of the logical business day, or even the end-of-business closing of books in an Pacific Coast store of a national retail chain, or the closing of a particular stock market trading day.

The method for achieving this replication is to replicate to a specific source database reference point using the new replication signal table of the invention. At a specific point in time in the business day, whether this time is logical or actual, the user inserts a row into the replication signal table indicating that replication should perform special processing when reaching this signal on the log. The replication capture component reads and continues to process log records until the signal insert log record is found. The signal table is updated by the capture component to indicate that this stop signal has been processed, and provides the log sequence number of the signal table insert log record. Capture continues to process data normally after processing this signal table insert record.

Assuming that the Apply program is started up just once each day to perform the replication apply of updates to the target data warehouse database tables, the apply program is now started, in event mode, and waits for an event to be posted with instructions of what data to apply. The update made by capture has now supplied the log sequence number (lsn) of the signal insert log record, and either through a user program or a trigger defined on the signal table, an event row is inserted into the replication EVENT table, supplying the value of the lsn as the END_SYNCHPOINT value in the event row. The apply program for all tables at the target database can then be replicated selectively, just to the point of the source lsn. Other data that has been captured beyond this point will be ignored by the apply program.

Figure 8:
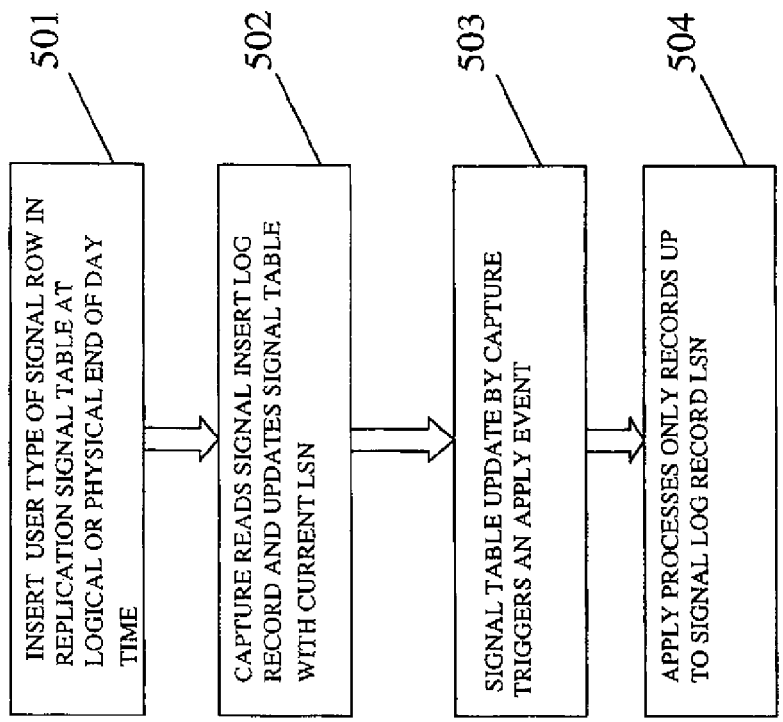
FIG. 8 illustrates capture and apply programs for tables at the target database then are replicated selectively, just to the point of the source lsn, and where other data that has been captured beyond this point will be ignored by the apply program.

This is illustrated in FIG. 8, where Block 501 shows inserting a user type of signal row in the replication signal table at the logical or physical end of day time. Block 502 shows capture reading the signal insert log record and updating the signal table with the current lsn. Block 503 shows the signal table update by the capture process triggering an apply event. Finally, block 504 shows apply process only recording up to the signal log record lsn.

The method, system, and program product of the invention can also be utilized to provide a provision of sequencing information input to a program that incrementally maintains a materialized view of a database.

The full concept of the maintenance of a materialized view is complex and is ancillary to the subject matter of this disclosure. However, the subject matter of this invention facilitates the implementation of a materialized view. At the core of this method is the concept that at any point in time, the correct state of a materialized view for a generalized point in time can be constructed by the combination of:

(a) join queries made between the actual source tables that comprise the view to be materialized and delta tables( i.e. tables comprised of the collected changes that have been made to the source tables up to some specific point in time ), and (b) compensation queries that account for overcounted or missing rows in the join queries of (a) above.

In order for this method to deliver the required outcome, the join queries in part(a) must be precisely sequenced with the compensation queries, and the contents of the delta tables. The replication capture process can produce the delta tables needed for this materialized view computation.

Figure 9:
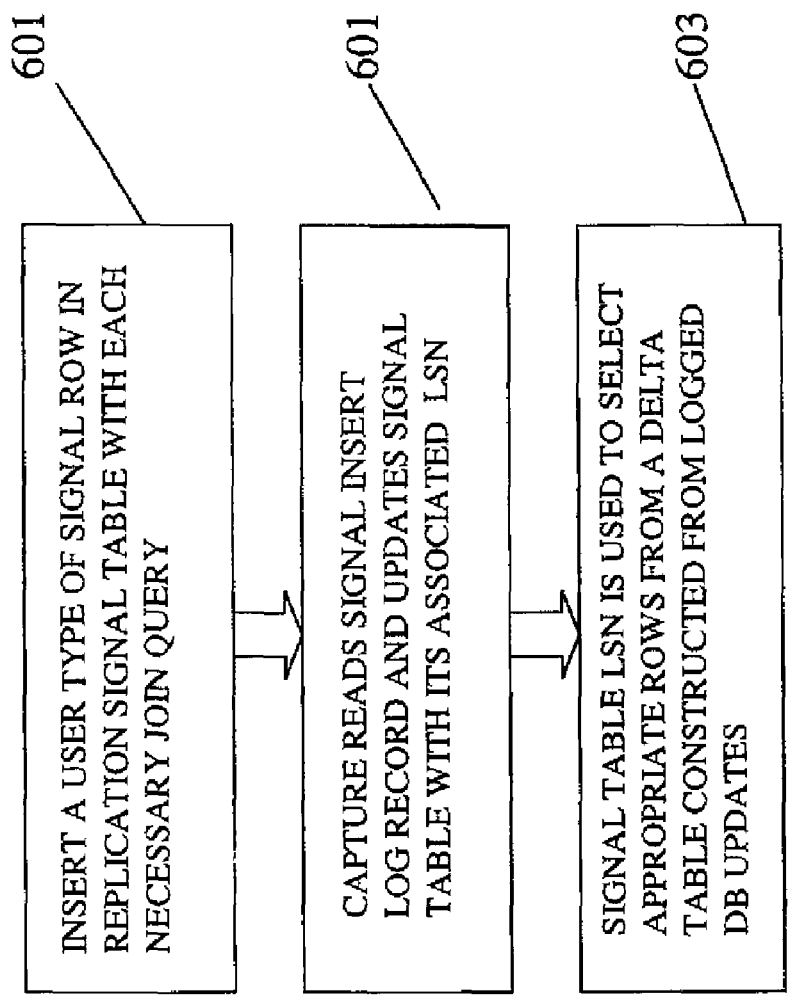
FIG. 9 illustrates a method for coordinating view queries with collected changed data using the signal table of the invention to provide the necessary sequencing between the queries and the delta changes.

The method for coordinating view queries with collected changed data using the signal table of the invention can provide the necessary sequencing between the queries in part (a), and the delta changes. A row is inserted to the signal table in the same transaction in which the join query is executed. When this insert record is seen to be committed by the capture log read program, the capture program will update the signal table with the lsn of the commit record for this transaction. Since all replication delta tables contain the lsn of the transactions that produced the changes, the lsn produced through the signal table can be used to coordinate the combination of the join and compensation queries. This is illustrated in the flow chart of FIG. 9. Block 601 shows inserting a user type of signal row in the replication signal table with each necessary join query. Block 602 shows the capture process reading the signal insert log record and updating the signal table with its associated lsn. Block 603 shows the signal table lsn being used to select the appropriate rows from a delta table constructed from logged db updates.

While the invention has been described with respect to certain preferred embodiments and exemplifications, it is not intended to limit the scope of the invention thereby, but solely by the claims appended hereto.

We claim:

1. A method of managing a database management system that includes a replication system and that has at least one database table that is subject to replication, a recovery log, and a replication signal table, said method comprising computer executable program code stored on a memory and executed on a processor to perform:

creating entries in the recovery log in response to changes to a state of any one or more of the at least one database table and the replication signal table, wherein said replication signal table is a specific table that is configured for all users of the database management system, and wherein the entries in the recovery log are ordered according to a total order;

inserting into the replication signal table, at least one row that describes a replication command to the replication system relating to the at least one database table;

detecting a recovery log entry in the recovery log that pertains to the at least one row in the replication signal table;

taking replication actions responsive to the recovery log entries that are positioned subsequent to the recovery log entry that pertains to the at least one row in the replication signal table, according to the total order of the recovery log.

2. The method of claim 1 wherein the replication command comprises a first command comprising a signal stopping the replication of changes related to the at least one database table.

3. The method of claim 1 wherein the replication command comprises a second command, and wherein the second command is a signal starting replication of changes to a database table.

4. The method of claim 3 wherein the database management system comprises at least two database tables, and the second command is a signal starting application of changes of contents of the first database table into a second database table.

5. The method of claim 1, further comprising ordering database update events in sequence using the recovery log, by using the recovery log to place asynchronous database update events in sequence between adjacent synchronous events.

6. The method of claim 1 comprising changing the schema or metadata of the at least one database table between the first command and the second command, and thereafter executing the second command.

7. The method of claim 1 comprising executing said replication command entered in the replication signal table only after taking actions in response to all preceding entries of the recovery log.

8. A database management system that includes a replication system, the database management system comprising:
   a memory storing computer executable program code;
   a processor executing the computer executable program code, the computer executable program code comprising:
   at least one database table that is subject to the replication system;
   a recovery log; and
   a replication signal table;
   said replication system creating entries in the recovery log in response to changes to a state of any one or more of the at least one database table and the replication signal table, wherein said replication signal table is a specific table that is configured for all users of the database management system, and wherein the entries in the recovery log are ordered according to a total order;
   said replication system inserting into the replication signal table, at least one row that describes a replication command to the replication system relating to the at least one database table;
   said replication system detecting a recovery log entry in the recovery log that pertains to the at least one row of the replication signal table;
   said replication system taking replication actions responsive to the recovery log entries that are positioned subsequent to the recovery log entry that pertains to the at least one row of the replication signal table, according to the total order of the recovery log.

9. The database management system of claim 8 wherein the replication command comprises a first command comprising a signal stopping the replication of changes related to the at least one database table.

10. The database management system of claim 8 wherein the replication command comprises a second command, and wherein the second command is a signal starting replication of changes to a database table.

11. The database management system of claim 10 comprising at least two database tables, and wherein the second command is a signal starting copying of contents of the first database table into second database table.

12. The database management system of claim 8 wherein the replication command comprises a first command comprising a signal stopping copying of data into the database table, and a second command is a signal starting copying of contents of the database table into a second database table.

13. The database management system of claim 12, wherein said database management system is configured and controlled for performing an operation on the database table between the first command and the second command, and thereafter executing the second command.

14. The database management system of claim 8 wherein said replication command entered in said replication signal table also controls the processing of database events in a same transaction as said replication command.

15. A computer program product comprising a processor usable storage medium storing computer program codes and executed by the processor, the program product for managing a database management system, comprising:
   said database management system including a replication system, at least one database table that is subject to replication, a recovery log, and a replication signal table;
   a program code for creating entries in the recovery log in response to changes to a state of any one or more of the at least one database table and the replication signal table, wherein said replication signal table is a specific table that is configured for all users of the database management system, and wherein the entries in the recovery log are ordered according to a total order;
   a program code for detecting a recovery log entry in the recovery log that pertains to the at least one row in the replication signal table; and
   a program code for taking replication action responsive to the recovery log entries that are positioned subsequent to the recovery log entry that pertains to the at least one row in the replication signal table, according to the total order of the recovery log.

16. The program product of claim 15 wherein the replication command comprises a first command comprising a signal stopping the replication of changes related to the at least one database table.

17. The program product of claim 15 wherein the replication command comprises a second command, and wherein the second command is a signal starting copying into the at least one database table.

18. The program product of claim 17 wherein the replication command comprises a first command comprising a signal stopping copying of data into the first database table, and the second command is a signal starting copying of contents of the first database table into the second database table.

19. The program product of claim 15 wherein the database management system comprising take the action of said replication command entered in the replication signal table only after taking actions in response to all preceding entries of the recovery log.

20. The program product of claim 15 wherein said replication command entered in said replication signal table also controls the processing of database events in a same transaction as said replication command.

* * * * *